United States Patent
Liu et al.

(10) Patent No.: US 9,229,598 B2
(45) Date of Patent: Jan. 5, 2016

(54) TOUCH PEN

(71) Applicant: Primax Electronics Ltd., Neihu, Taipei (TW)

(72) Inventors: Chou-Liang Liu, Taipei (TW); Chien-Pang Chien, Taipei (TW); Hung-Ming Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 14/452,002

(22) Filed: Aug. 5, 2014

(65) Prior Publication Data

US 2015/0355748 A1    Dec. 10, 2015

(30) Foreign Application Priority Data

Jun. 4, 2014    (CN) .......................... 2014 1 0245027

(51) Int. Cl.
*G06F 3/045* (2006.01)
*G06F 3/044* (2006.01)
*G06F 3/0354* (2013.01)
*G06F 3/0488* (2013.01)
*G06F 3/0484* (2013.01)

(52) U.S. Cl.
CPC ............ *G06F 3/044* (2013.01); *G06F 3/03545* (2013.01); *G06F 3/0484* (2013.01); *G06F 3/0488* (2013.01); *G06F 3/04845* (2013.01)

(58) Field of Classification Search
CPC ... G06F 3/03545; G06F 3/044; G06F 3/0416; G06F 3/033; G06F 3/0354; G06F 3/043; G06F 3/041

USPC .................................. 345/174, 173, 175, 179
See application file for complete search history.

(56) References Cited

U.S. PATENT DOCUMENTS

| | | | |
|---|---|---|---|
| 2011/0169775 A1* | 7/2011 | Liaw et al. ..................... | 345/175 |
| 2011/0304577 A1* | 12/2011 | Brown et al. ................. | 345/174 |
| 2011/0316815 A1* | 12/2011 | Fang ............................. | 345/179 |
| 2012/0086674 A1* | 4/2012 | Kim et al. ..................... | 345/179 |
| 2012/0139879 A1* | 6/2012 | Kim et al. ..................... | 345/179 |
| 2012/0162155 A1* | 6/2012 | Jiang et al. .................... | 345/179 |
| 2013/0076701 A1* | 3/2013 | Wu ................................ | 345/179 |
| 2013/0100086 A1* | 4/2013 | Kim ............................... | 345/179 |
| 2013/0300720 A1* | 11/2013 | Hung ............................ | 345/179 |
| 2014/0078070 A1* | 3/2014 | Armstrong-Muntner ..... | 345/173 |
| 2014/0085248 A1* | 3/2014 | Wang ............................ | 345/174 |
| 2014/0176495 A1* | 6/2014 | Vlasov ........................... | 345/174 |
| 2014/0267060 A1* | 9/2014 | Li et al. ......................... | 345/173 |
| 2014/0306929 A1* | 10/2014 | Huang et al. .................. | 345/174 |
| 2014/0354555 A1* | 12/2014 | Shahparnia et al. .......... | 345/173 |
| 2015/0002476 A1* | 1/2015 | Lin et al. ...................... | 345/175 |
| 2015/0022487 A1* | 1/2015 | Kuo .............................. | 345/174 |

\* cited by examiner

*Primary Examiner* — Fred Tzeng
(74) *Attorney, Agent, or Firm* — Kirton McConkie; Evan R. Witt (57) ABSTRACT

A touch pen for a capacitive touch screen is provided. The touch pen includes a signal receiver conductor, a signal detecting and adjusting circuit, and a signal transmitter conductor. The signal receiver conductor receives a first touch signal from the capacitive touch screen. The signal detecting and adjusting circuit enlarges the first touch signal to a second touch signal having a standard intensity with a first magnification factor, a second magnification factor and a third magnification factor. The signal transmitter conductor issues the second touch signal to the capacitive touch screen. According to the second touch signal, the capacitive touch screen senses a position of a touch point of the touch pen.

12 Claims, 5 Drawing Sheets

TOUCH PEN

FIELD OF THE INVENTION

The present invention relates to a touch pen, and more particularly to a touch pen for a capacitive touch screen.

BACKGROUND OF THE INVENTION

Nowadays, the commercially available touch screens are classified into several types, including a resistive touch screen, an acoustic wave touch screen, an infrared touch screen and a capacitive touch screen. When an external force is exerted on the resistive touch screen, a voltage is generated and a command is recognized according to the voltage. Moreover, acoustic waves or infrared rays pass over the surface of the acoustic wave touch screen or the infrared touch screen. By touching the surface of the acoustic wave touch screen or the infrared touch screen, the travelling path of the acoustic wave or the infrared ray is blocked and thus the corresponding command is recognized. When the human body is contacted with the capacitive touch screen, the capacitance value of the touch point of the capacitive touch screen is subjected to a change. According to the change of the capacitance value, the position of the touch position is recognized. In views of the touch accuracy and the fabricating cost, the capacitive touch screen is widely adopted.

Figure 1:
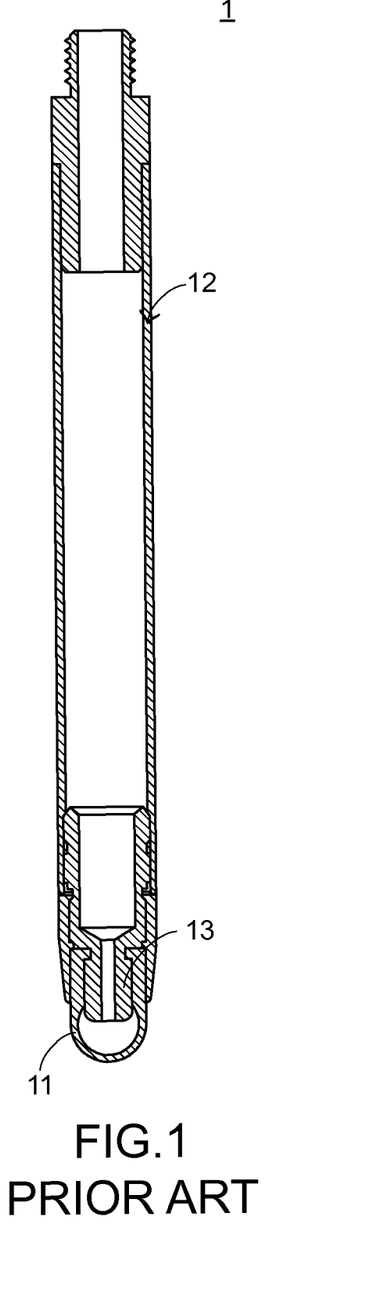
FIG. 1 is a schematic cross-sectional view illustrating a conventional touch pen.

For complying with the utilized function of the capacitive touch screen, a capacitive touch pen is introduced into the market. Hereinafter, the structure of a conventional touch pen will be illustrated with reference to FIG. 1. FIG. 1 is a schematic cross-sectional view illustrating a conventional touch pen. A conductive rubber tip 11 of the conventional touch pen 1 is used as a contact terminal. The conductive rubber tip 11 is sheathed around a fixing post 13, which is contacted with a metallic pen tube 12. Consequently, the conductive rubber tip 11 and the metallic pen tube 12 are combined together. When the conductive rubber tip 11 touches the capacitive touch screen, the electric energy of the human body is transmitted to the conductive rubber tip 11 through the metallic pen tube 12 and the fixing post 13. Consequently, the capacitance value of the touch point between the capacitive touch screen and the conductive rubber tip 11 is changed. According to the change of the capacitance value, a position of the touch point can be accurately judged by the capacitive touch screen.

However, if the diameter of the conductive rubber tip 11 is smaller than 5 mm, the contact area is very small. Under this circumstance, the capacitive touch screen fails to accurately realize the position of the touch point. For preventing the small conductive rubber tip from causing the poor sensing problem, the diameter of the current conductive rubber tip is usually in the range between 5 mm to 8 mm. Since the larger conductive rubber tip may hinder the line of vision of the user, it is difficult for the user to precisely perform the touch control.

Therefore, it is an important issue to reduce the contact terminal of the capacitive touch pen with respect to the capacitive touch screen while allowing the capacitive touch screen to accurately judge the position of the touch point.

SUMMARY OF THE INVENTION

An object of the present invention provides a touch pen having a smaller-diameter contact terminal with respect to the capacitive touch screen, so that the user can operate the touch pen to precisely perform the touch control action on the capacitive touch screen.

In accordance with an aspect of the present invention, there is provided a touch pen for a capacitive touch screen. The touch pen includes a signal receiver conductor, a signal detecting and adjusting circuit, and a signal transmitter conductor. The signal receiver conductor receives a first touch signal from the capacitive touch screen. The signal detecting and adjusting circuit enlarges the first touch signal to a second touch signal, wherein the second touch signal has a standard intensity. The signal transmitter conductor issues the second touch signal to the capacitive touch screen. According to the second touch signal, the capacitive touch screen senses a position of a touch point of the touch pen.

In accordance with another aspect of the present invention, there is provided a touch pen for a capacitive touch screen. The touch pen includes a signal receiver conductor, a signal transmitter conductor, a pipe, a pen tube, a coupling ring, a circuit board, and a signal detecting and adjusting circuit. The signal receiver conductor is a stick-shaped structure. The signal transmitter conductor is a ring-shaped structure with a hollow portion. The pipe is made of a conductive material. The signal receiver conductor and the signal transmitter conductor are isolated from each other through the pipe. The pipe is accommodated within the signal transmitter conductor. The signal receiver conductor is accommodated within the pipe and protruded outside the signal transmitter conductor. The pen tube is made of the conductive material. The coupling ring is made of a nonconductive material and connected with the pen tube and the signal transmitter conductor. The pen tube and the signal transmitter conductor are isolated from each other through the coupling ring. The circuit board is disposed within the pen tube. The signal detecting and adjusting circuit is disposed on the circuit board and connected with the signal receiver conductor and the signal transmitter conductor. When the pen tube is grasped by a user and the signal receiver conductor is contacted with the capacitive touch screen to operate the capacitive touch screen, a first touch signal from the capacitive touch screen is received by the signal receiver conductor, the signal detecting and adjusting circuit enlarges the first touch signal to a second touch signal having a standard intensity, and the signal transmitter conductor issues the second touch signal to the capacitive touch screen. According to the second touch signal, the capacitive touch screen senses a position of a touch point of the touch pen.

In accordance with a further aspect of the present invention, there is provided a signal processing method for use in a capacitive touch screen to sense a position of a touch point of a touch pen. The signal processing method includes the following steps. In a step (A), when the touch pen is placed near the capacitive touch screen, the touch pen receives a first touch signal from the capacitive touch screen. In a step (B), the touch pen enlarges the first touch signal with a first magnification factor so as to generate a first amplified signal. In a step (C), the touch pen calculates a second magnification factor according to the first amplified signal and an intermediary intensity, and enlarges the first amplified signal with the second magnification factor so as to generate a second amplified signal, wherein the second amplified signal has the intermediary intensity. In a step (D), the touch pen judges whether a pushing force is exerted on the signal receiver conductor. If the pushing force is exerted on the signal receiver conductor, a step (E) is performed. Whereas, if the pushing force is not exerted on the signal receiver conductor, the steps (A), (B) and (C) are repeatedly done. In the step (E), the touch pen enlarges the second amplified signal with a third magnification factor so as to generate a second touch signal, wherein the second touch signal has a standard intensity. In a step (F), the touch pen issues the second touch signal to the capacitive touch screen, so that the position of the touch point of the touch pen is sensed by the capacitive touch screen.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
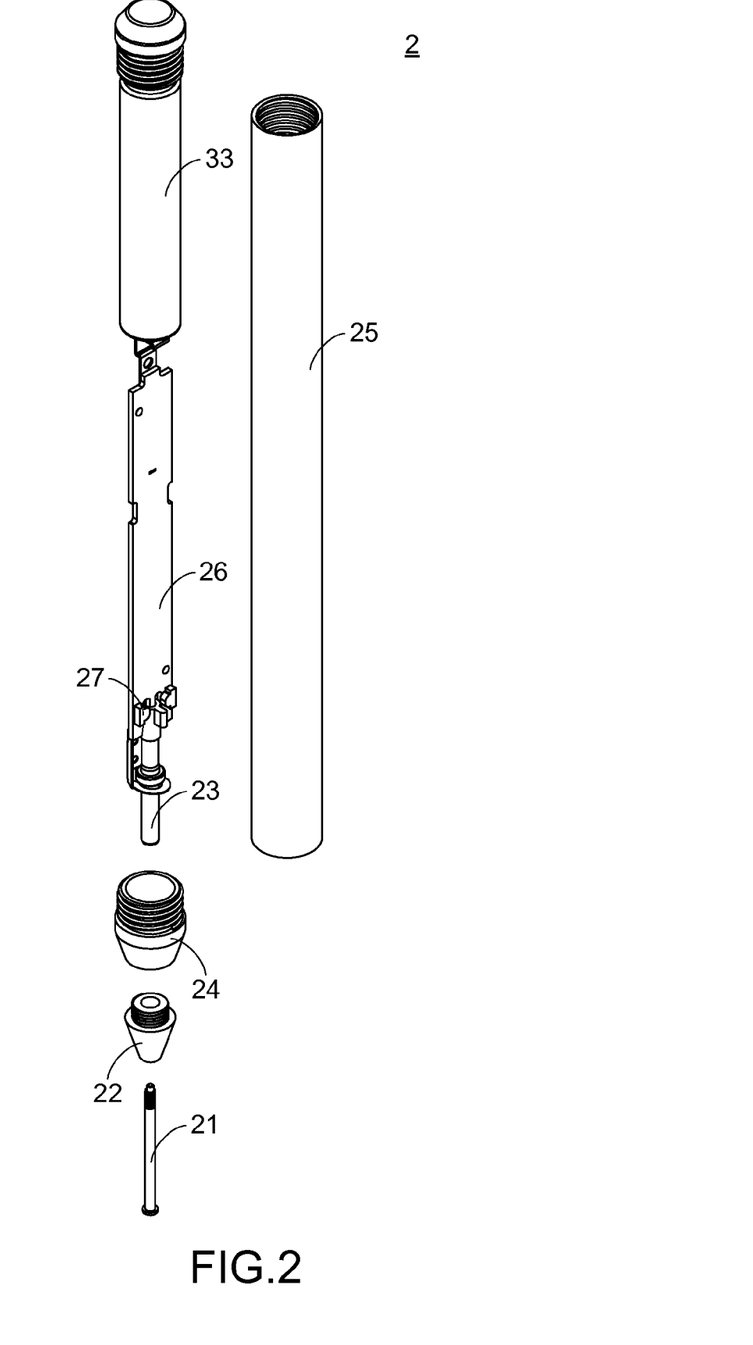
FIG. 2 is a schematic exploded view illustrating a touch pen according to an embodiment of the present invention.
Figure 3:
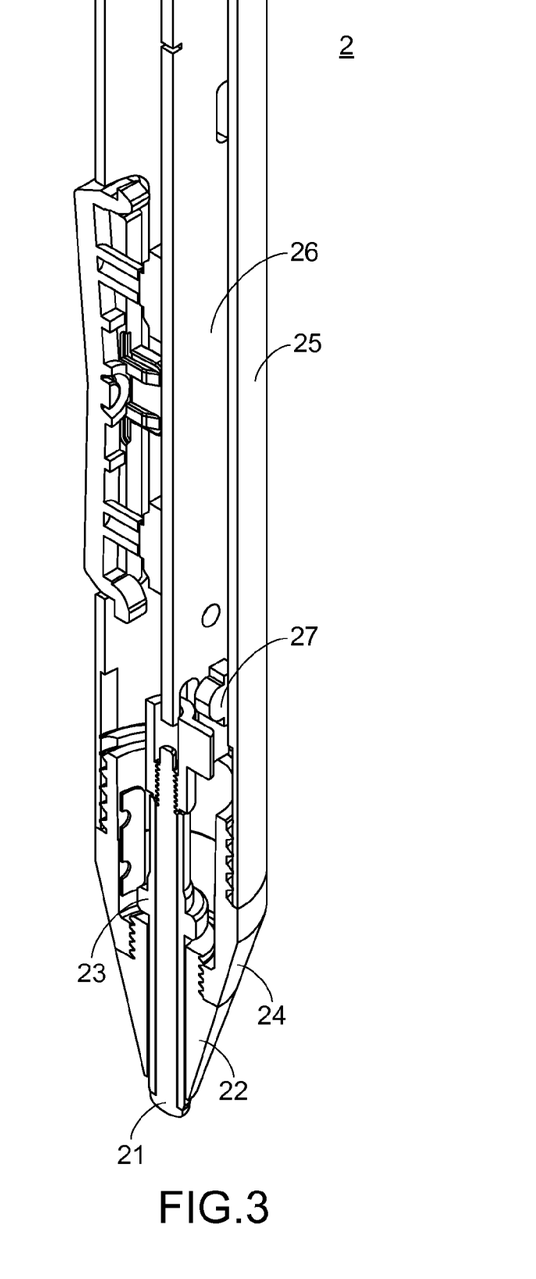
FIG. 3 is a schematic cutaway view illustrating the touch pen according to the embodiment of the present invention.

Hereinafter, a touch pen 2 according to an embodiment of the present invention will be illustrated with reference to FIGS. 2 and 3. FIG. 2 is a schematic exploded view illustrating a touch pen according to an embodiment of the present invention. FIG. 3 is a schematic cutaway view illustrating the touch pen according to the embodiment of the present invention.

The components of the touch pen 2 and the assembling sequence thereof will be illustrated as follows. As shown in FIG. 2, the touch pen 2 comprises a signal receiver conductor 21, a signal transmitter conductor 22, a pipe 23, a coupling ring 24, a pen tube 25, a circuit board 26, and a sensing element 27. In the touch pen 2, the signal receiver conductor 21 is used for receiving a signal from a capacitive touch screen (not shown). After the intensity of the signal is enlarged to a standard intensity, the signal with the standard intensity is transmitted from the signal transmitter conductor 22 to the capacitive touch screen. Consequently, the capacitive touch screen may sense the position of the touch point of the touch pen. In other words, the user may operate the signal receiver conductor 21 to control the capacitive touch screen, which will be illustrated as follows.

In this embodiment, the signal receiver conductor 21, the signal transmitter conductor 22, the pipe 23 and the pen tube 25 are all made of conductive materials. For example, the conductive materials are metallic materials or conductive plastic materials, but are not limited thereto. The coupling ring 24 is made of a nonconductive material. The nonconductive material is a plastic material, but is not limited thereto.

Please refer to FIGS. 2 and 3. For assembling the touch pen 2, the coupling ring 24 is connected with the pen tube 25 and the signal transmitter conductor 22, the circuit board 26 is disposed within the pen tube 25, and the sensing element 27 is located at a bottom edge (i.e. a bottom side as shown in FIG. 2) of the circuit board 26 and arranged near the coupling ring 24. The pipe 23 is located near the bottom edge (i.e. the bottom side as shown in FIG. 2) of the circuit board 26, and accommodated within the signal transmitter conductor 22. The signal receiver conductor 21 is accommodated within the pipe 23 and protruded outside the signal transmitter conductor 22. Consequently, the signal receiver conductor 21 may be contacted with the capacitive touch screen.

The signal receiver conductor 21 is a stick-shaped structure, and the signal transmitter conductor 22 is a ring-shaped structure with a hollow portion. The signal receiver conductor 21 and the signal transmitter conductor 22 are isolated from each other through the pipe 23. That is, the pipe 23 can provide a shielding function of preventing interference between signals. The pen tube 25 and the signal transmitter conductor 22 are isolated from each other through the coupling ring 24. Consequently, the short-circuited problem can be avoided.

When a pushing force is exerted on the signal receiver conductor 21, the signal receiver conductor 21 and the pipe 23 are collaboratively moved toward the sensing element 27 to trigger the sensing element 27. Consequently, the movement of the signal receiver conductor 21 can be sensed by the sensing element 27. In this embodiment, the sensing element 27 is an optical sensor. In some other embodiments, the sensing element 27 is a pressure sensor, but is not limited thereto.

In case that the sensing element 27 is the optical sensor, the movement of the signal receiver conductor 21 and the pipe 23 may block the optical path of the sensing element 27. Consequently, the movement of the signal receiver conductor 21 can be sensed by the sensing element 27. In this embodiment, an arbitrary structure (e.g. a bulge) is formed at or connected with an end of the signal receiver conductor 21 or an end of the pipe 23 in order to block the optical path of the sensing element 27. In the drawings, the structure for blocking the optical path of the sensing element 27 is presented herein for purpose of illustration and description only. Whereas, in case that the sensing element 27 is the pressure sensor, the movement of the signal receiver conductor 21 and the pipe 23 may press the sensing element 27. Consequently, the resistance value outputted from the sensing element 27 is subjected to a change. According to the change of the resistance value, the movement of the signal receiver conductor 21 can be sensed by the sensing element 27.

Figure 4:
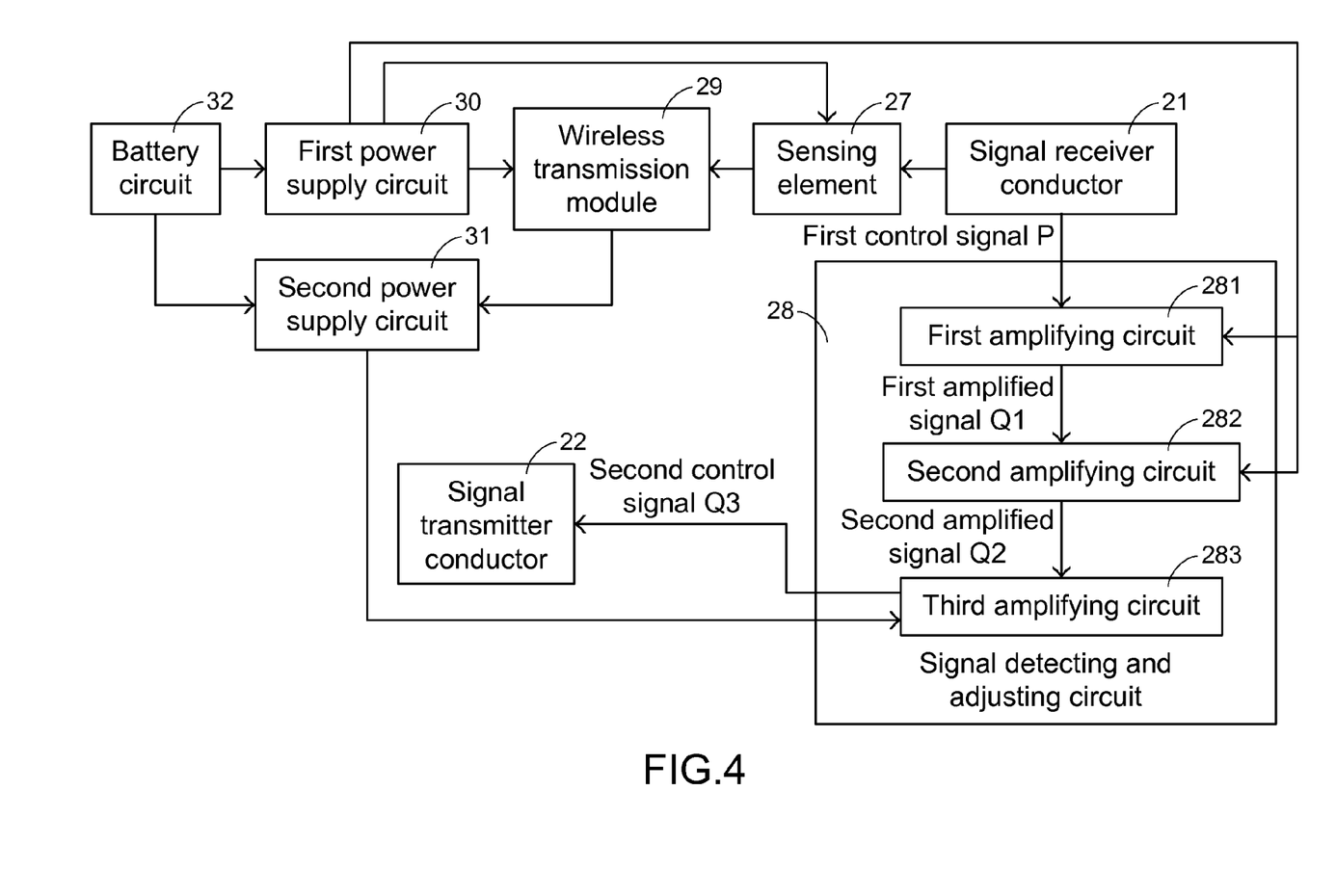
FIG. 4 is a schematic circuit block diagram illustrating the touch pen according to the embodiment of the present invention.
Figure 5:
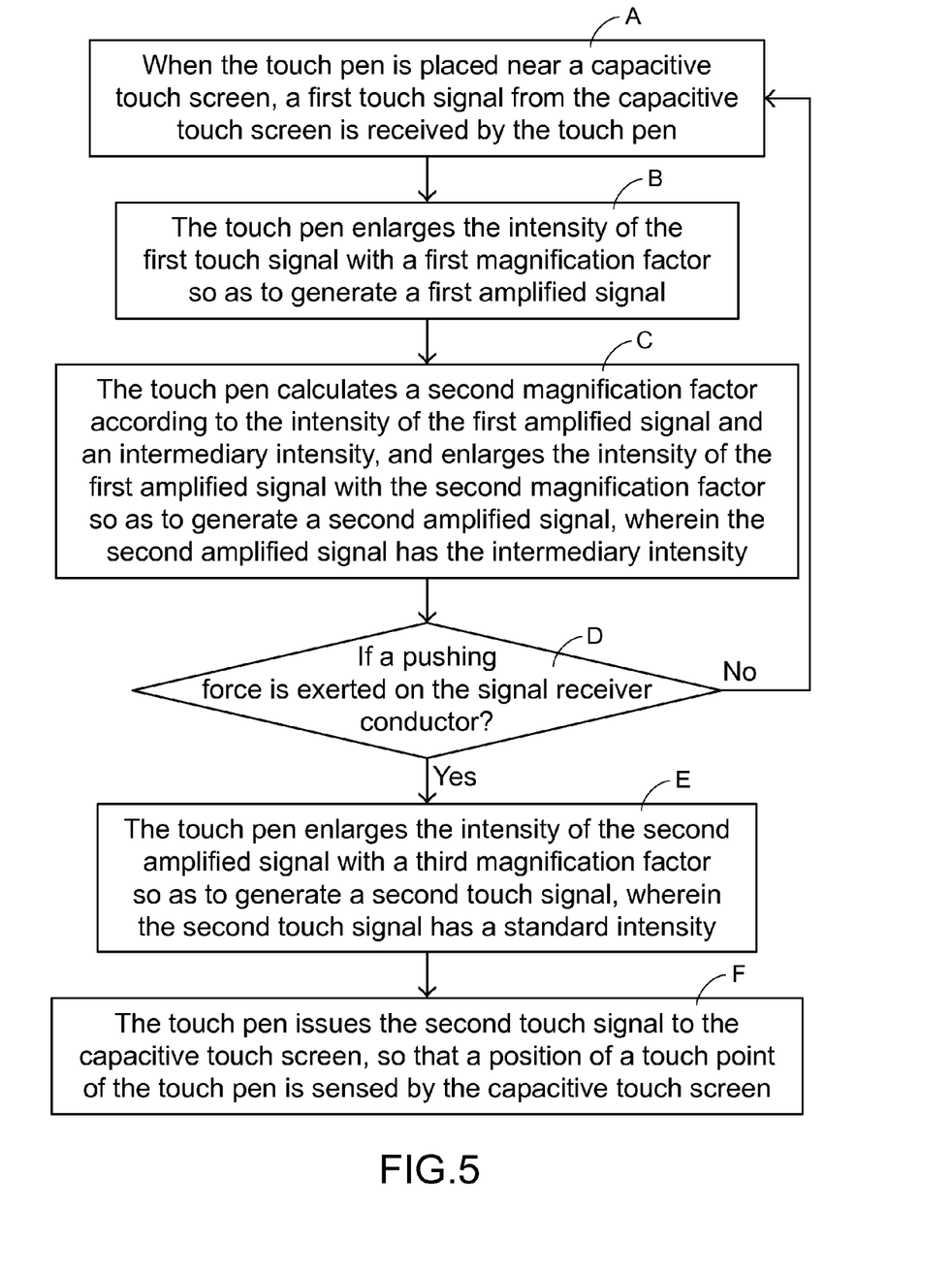
FIG. 5 is a flowchart of a signal processing method for the touch pen according to the embodiment of the present invention.

Hereinafter, the operating principles of the touch pen 2 will be illustrated with reference to FIGS. 2-5. FIG. 4 is a schematic circuit block diagram illustrating the touch pen according to the embodiment of the present invention. FIG. 5 is a flowchart of a signal processing method for the touch pen according to the embodiment of the present invention.

The touch pen 2 of this embodiment further comprises a signal detecting and adjusting circuit 28, a wireless transmission module 29, a first power supply circuit 30, a second power supply circuit 31, and a battery circuit 32, which are connected with the signal receiver conductor 21 and the signal transmitter conductor 22 and disposed on the circuit board 26. The signal detecting and adjusting circuit 28 comprises a first amplifying circuit 281, a second amplifying circuit 282, and a third amplifying circuit 283.

As shown in FIG. 4, the first power supply circuit 30 is connected with the first amplifying circuit 281, the second amplifying circuit 282, the wireless transmission module 29 and the sensing element 27 in order to provide electricity to the first amplifying circuit 281, the second amplifying circuit 282, the wireless transmission module 29 and the sensing element 27. The second power supply circuit 31 is connected with the third amplifying circuit 283 in order to provide electricity to the third amplifying circuit 283. Moreover, the wireless transmission module 29 is connected with the second power supply circuit 31 and the sensing element 27.

When a battery 33 (see FIG. 2) is installed in the touch pen 2, the battery circuit 32 starts to provide electricity to the first power supply circuit 30 and the second power supply circuit 31. In addition, the first power supply circuit 30 starts to provide electricity to the first amplifying circuit 281, the second amplifying circuit 282, the wireless transmission module 29 and the sensing element 27, but the second power supply circuit 31 does not immediately provide electricity to the third amplifying circuit 283.

Moreover, when the signal receiver conductor 21 is moved toward the sensing element 27 in response to a pushing force and the movement of the signal receiver conductor 21 is sensed by the sensing element 27, the corresponding signal is transmitted from the sensing element 27 to the second power supply circuit 31 through the wireless transmission module 29. When the corresponding signal is received by the second power supply circuit 31, the second power supply circuit 31 starts to provide electricity to the third amplifying circuit 283. As a consequence, a power-saving purpose can be achieved.

In case that the sensing element 27 is the pressure sensor, the resistance value outputted from the sensing element 27 is subjected to a change. According to the change of the resistance value, the pushing force that is exerted on the signal receiver conductor 21 can be sensed by the sensing element 27. Then, a control signal corresponding to the pushing force is transmitted the capacitive touch screen through the wireless transmission module 29. According to the control signal, a corresponding function is executed by the capacitive touch screen. For example, the thickness of the line shown on the capacitive touch screen is correspondingly changed.

The flowchart of the signal processing method according to the present invention will be illustrated in more details as follows. In this context, the term "standard intensity" shown in the step E of FIG. 5 denotes the minimum intensity that can be sensed by most of the commercially available capacitive touch screens. Consequently, the signal detecting and adjusting circuit 28 is used for amplifying the intensity of a first control signal P to the standard intensity. However, since the intensity of the first control signal P is possibly unable to be enlarged to the standard intensity in a single stage, the signal detecting and adjusting circuit 28 of this embodiment can accurately enlarge the intensity of the first control signal P to the standard intensity in three stages by the first amplifying circuit 281, the second amplifying circuit 282 and the third amplifying circuit 283.

Firstly, in a step A of FIG. 5, the pen tube 25 is grasped by the user and the signal receiver conductor 21 is placed near a capacitive touch screen (not shown). Since the capacitive touch screen senses that the signal receiver conductor 21 is placed nearby, the capacitive touch screen issues a first touch signal P.

Then, in a step B of FIG. 5, the first touch signal P is transmitted to the signal detecting and adjusting circuit 28. Consequently, the first amplifying circuit 281 of the signal detecting and adjusting circuit 28 may enlarge the intensity of the first touch signal P with a first magnification factor so as to generate a first amplified signal Q1. In this embodiment, the first magnification factor is a fixed magnification factor (e.g. 100), but is not limited thereto. For example, if the intensity of the first touch signal P is 0.007 V and the first magnification factor is 100, the intensity of the first amplified signal Q1 is 0.7 V.

Generally, the first touch signals P generated by different brands or model numbers of capacitive touch screens have different intensities. That is, the intensities of the first amplified signals Q1 for different capacitive touch screens are different. In a step C of FIG. 5, the intensity of the first amplified signal Q1 is enlarged to a default intermediary intensity. Consequently, the second amplifying circuit 282 has to previously calculate a second magnification factor for enlarging the first amplified signal Q1 to the intermediary intensity.

For example, if the intermediary intensity is 2.8 V and the intensity of the first amplified signal Q1 is 0.7 V, the second magnification factor is 4. Then, the second amplifying circuit 282 may enlarge the intensity of the first amplified signal Q1 with the second magnification factor so as to generate a second amplified signal Q2. Ideally, after the step C, the second amplified signal Q2 has the intermediary intensity.

Moreover, if the touch pen 2 is only located near the capacitive touch screen without tapping, selecting or drawing on the capacitive touch screen, the touch pen 2 is not pressed by the capacitive touch screen. Under this circumstance, the signal receiver conductor 21 and the pipe 23 are not collaboratively moved toward the sensing element 27. Since no pushing force in the direction toward the sensing element 27 is exerted on the signal receiver conductor 21, the second power supply circuit 31 does not provide electricity to the third amplifying circuit 283. Consequently, according to the judging result of the step D of FIG. 5, the touch pen 2 continuously receives the first touch signal P from the capacitive touch screen, and the first amplifying circuit 281, the second amplifying circuit 282 calculates the second magnification factor to generate the second amplified signal Q2 with the intermediary intensity. Meanwhile, the step E is not performed.

On the other hand, if the touch pen 2 is pressed by the capacitive touch screen and the signal receiver conductor 21 and the pipe 23 are collaboratively moved toward the sensing element 27, the movement of the signal receiver conductor 21 is sensed by the sensing element 27. Meanwhile, the second power supply circuit 31 starts to provide electricity to the third amplifying circuit 283. Consequently, in the step E of FIG. 5, the signal with the above-mentioned standard intensity is generated. That is, the third amplifying circuit 283 may enlarge the intensity of the second amplified signal Q2 with a third magnification factor so as to generate a second touch signal Q3.

For example, if the standard intensity is 18 V and the intensity of the second amplified signal Q2 (i.e. the intermediary intensity) is 2.8 V, the third magnification factor is 18/2.8. Since the intensity of the second amplified signal Q2 is the default intermediary intensity, the third magnification factor is a default fixed magnification factor. Ideally, after the step E, the second touch signal Q3 has the standard intensity.

In this embodiment, the intermediary intensity is a power supply voltage of the first power supply circuit 30, and the standard intensity is a power supply voltage of the second power supply circuit 31. It is noted that the magnitudes of the intermediary intensity and the standard intensity are not restricted.

Afterwards, in a step F of FIG. 5, the second touch signal Q3 is transmitted to the signal transmitter conductor 22. When the second touch signal Q3 from the signal transmitter conductor 22 is received by the capacitive touch screen, the position of the touch point of the touch pen 2 can be sensed by the capacitive touch screen.

From the above descriptions, the first amplifying circuit 281, the second amplifying circuit 282 and the third amplifying circuit 283 may enlarge the intensity of the first control signal P in three stages so as to generate the second touch signal Q3 with the standard intensity. The standard intensity denotes the minimum intensity that can be sensed by most of the commercially available capacitive touch screens. Since the diameter of the signal receiver conductor 21 is relatively smaller, the contact terminal of the touch pen 2 with respect to the capacitive touch screen is effectively reduced. Under this circumstance, the user can precisely perform the touch control action on the capacitive touch screen.

Moreover, according to the present invention, the sensing element 27 may control the timing of providing electricity from the second power supply circuit 31 to the third amplifying circuit 283. In the non-use stage of the touch pen 2, the first power supply circuit 30 only provides a small magnitude of electricity to the first amplifying circuit 281, the second amplifying circuit 282, the wireless transmission module 29 and the sensing element 27. Consequently, the power-saving purpose is achieved. Moreover, by means of the above design, it is not necessary to repeatedly enable and disable the wireless transmission module 29 and the sensing element 27. Consequently, the starting time of using the touch pen 2 is saved.

Moreover, according to the second magnification factor calculated by the second amplifying circuit 282, the touch pen 2 of the present invention may be applied to different brands or model numbers of capacitive touch screens. That is, by using the signal processing method of the present invention, the intensity of the first touch signals P generated by any brand or model number of capacitive touch screen can be enlarged to the standard intensity. Moreover, in the non-usage status, the second amplifying circuit 282 may previously calculate the second magnification factor. Consequently, in the usage status, the second amplifying circuit 282 may directly enlarge the first amplified signals Q1 so as to generate the second amplified signal Q2. Under this circumstance, the position of the touch point of the touch pen 2 can be sensed by the capacitive touch screen more quickly.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch pen for a capacitive touch screen, the touch pen comprising:
   a signal receiver conductor receiving a first touch signal from the capacitive touch screen;
   a signal detecting and adjusting circuit enlarging the first touch signal to a second touch signal, wherein the second touch signal has a standard intensity, wherein the signal detecting and adjusting circuit comprises:
     a first amplifying circuit enlarging the first touch signal with a first magnification factor so as to generate a first amplified signal;
     a second amplifying circuit calculating a second magnification factor according to the first amplified signal and an intermediary intensity, and enlarging the first amplified signal with the second magnification factor so as to generate a second amplified signal, wherein the second amplified signal has the intermediary intensity; and
     a third amplifying circuit enlarging the second amplified signal with a third magnification factor so as to generate the second touch signal; and
   a signal transmitter conductor issuing the second touch signal to the capacitive touch screen, wherein according to the second touch signal, the capacitive touch screen senses a position of a touch point of the touch pen.

2. The touch pen according to claim 1, wherein the touch pen further comprises:
   a first power supply circuit providing electricity to the first amplifying circuit and the second amplifying circuit; and
   a second power supply circuit providing electricity to the third amplifying circuit.

3. The touch pen according to claim 2, wherein the pen tube further comprises a wireless transmission module, wherein the first power supply circuit further provides electricity to a wireless transmission module.

4. The touch pen according to claim 2, wherein the pen tube further comprises a sensing element that senses a movement of the signal receiver conductor, wherein when the movement of the signal receiver conductor is sensed by the sensing element, the second power supply circuit starts to provide electricity to the third amplifying circuit.

5. The touch pen according to claim 4, wherein the pen tube further comprises a wireless transmission module, wherein the wireless transmission module is connected with the sensing element and the second power supply circuit, wherein in response to the movement of the signal receiver conductor, a corresponding signal is transmitted to the second power supply circuit through the wireless transmission module, so that the second power supply circuit starts to provide electricity to the third amplifying circuit.

6. The touch pen according to claim 4, wherein the pen tube further comprises a wireless transmission module, wherein the wireless transmission module is connected with the sensing element, wherein when a pushing force exerted on the signal receiver conductor is sensed by the sensing element, a value of the pushing force is transmitted to the capacitive touch screen through the wireless transmission module.

7. The touch pen according to claim 4, wherein the sensing element is an optical sensor or a pressure sensor.

8. A touch pen for a capacitive touch screen, the touch pen comprising:
   a signal receiver conductor, wherein the signal receiver conductor is a stick-shaped structure;
   a signal transmitter conductor, wherein the signal transmitter conductor is a ring-shaped structure with a hollow portion;
   a pipe made of a conductive material, wherein the signal receiver conductor and the signal transmitter conductor are isolated from each other through the pipe, wherein the pipe is accommodated within the signal transmitter conductor, and the signal receiver conductor is accommodated within the pipe and protruded outside the signal transmitter conductor;
   a pen tube made of the conductive material;
   a coupling ring made of a nonconductive material and connected with the pen tube and the signal transmitter conductor, wherein the pen tube and the signal transmitter conductor are isolated from each other through the coupling ring;
   a circuit board disposed within the pen tube; and
   a signal detecting and adjusting circuit disposed on the circuit board and connected with the signal receiver conductor and the signal transmitter conductor,
   wherein when the pen tube is grasped by a user and the signal receiver conductor is contacted with the capacitive touch screen to operate the capacitive touch screen, a first touch signal from the capacitive touch screen is received by the signal receiver conductor, the signal detecting and adjusting circuit enlarges the first touch signal to a second touch signal having a standard intensity, and the signal transmitter conductor issues the second touch signal to the capacitive touch screen, wherein according to the second touch signal, the capacitive touch screen senses a position of a touch point of the touch pen.

9. The touch pen according to claim 8, wherein the touch pen further comprises a sensing element, wherein the sensing element is disposed on the circuit board and arranged near the coupling ring, wherein when a pushing force is exerted on the signal receiver conductor, the signal receiver conductor is moved toward the sensing element to trigger the sensing element, so that a movement of the signal receiver conductor is sensed by the sensing element.

10. The touch pen according to claim 9, wherein the signal detecting and adjusting circuit comprises a first amplifying circuit, a second amplifying circuit and a third amplifying circuit, and the touch pen further comprises a first power supply circuit and a second power supply circuit, wherein the first power supply circuit and the second power supply circuit are disposed on the circuit board, the first power supply circuit is connected with the first amplifying circuit, the second amplifying circuit and the sensing element, and the second power supply circuit is connected with the third amplifying circuit.

11. The touch pen according to claim 10, wherein the pen tube further comprises a wireless transmission module, wherein the wireless transmission module is disposed on the circuit board, and the wireless transmission module is connected with the first amplifying circuit, the second amplifying circuit and the sensing element.

12. A signal processing method for use in a capacitive touch screen to sense a position of a touch point of a touch pen, the signal processing method comprising steps of:
(A) when the touch pen is placed near the capacitive touch screen, the touch pen receiving a first touch signal from the capacitive touch screen;
(B) the touch pen enlarging the first touch signal with a first magnification factor so as to generate a first amplified signal;
(C) the touch pen calculating a second magnification factor according to the first amplified signal and an intermediary intensity, and enlarging the first amplified signal with the second magnification factor so as to generate a second amplified signal, wherein the second amplified signal has the intermediary intensity;
(D) the touch pen judging whether a pushing force is exerted on the signal receiver conductor, wherein if the pushing force is exerted on the signal receiver conductor, a step (E) is performed, wherein if the pushing force is not exerted on the signal receiver conductor, the steps (A), (B) and (C) are repeatedly done;
(E) the touch pen enlarging the second amplified signal with a third magnification factor so as to generate a second touch signal, wherein the second touch signal has a standard intensity; and
(F) the touch pen issuing the second touch signal to the capacitive touch screen, so that the position of the touch point of the touch pen is sensed by the capacitive touch screen.

* * * * *